UNITED STATES PATENT OFFICE.

JOZEF KLEIN, OF NEW YORK, N. Y.

BRAZING AND WELDING COMPOUND AND METHOD OF PREPARING SAME.

1,349,966.

No Drawing.

Specification of Letters Patent. Patented Aug. 17, 1920.

Application filed June 24, 1920. Serial No. 391,497.

*To all whom it may concern:*

Be it known that I, JOZEF KLEIN, citizen of Hungary, residing at New York, in the county of New York and State of New York, have invented certain new and useful Improvements in Brazing and Welding Compounds and Methods of Preparing Same, of which the following is a specification.

This invention relates to brazing and welding compounds and has for its object the provision of a compound which is effective to unite metal objects, especially parts made of steel, so firmly that the weld or brazed joint is often stronger than the solid metal.

A further object of this invention is the provision of a satisfactory method for making said compound.

To attain the above and other objects, I employ the compound prepared and used as described hereinafter. My improved compound consists of the following ingredients mixed in the manner described and substantially in the proportions stated.

To somewhat less than an eighth of a pound of water, I add a quarter of a pound of quick lime in small quantities at a time until the entire amount of lime is used. I then prefer to add a small quantity of sand to make up three-eighths of a pound total weight, though the sand may be omitted without greatly reducing the effectiveness of the composition. The resulting mixture, after being dried, is then broken up and ground into powdered form. A pound of borax is then melted and poured on to a flat warm steel plate, on which the melted borax is spread out evenly and flat, as for instance by means of a flat wooden block. The powdered slaked lime and sand mixture is then sprinkled over the borax and the whole allowed to cool.

After removal from the plate, the mixture of borax, lime and sand is heated until molten to thoroughly mix the ingredients. After again cooling, the mixture is then ground up with about a quarter pound of iron filings. The amount of compound thus prepared is sufficient to cover about thirty two square inches of metal surface.

To use my improved compound, the ends of the metal surface to be welded or brazed having been properly shaped as by making a scarf joint there, the parts heated to a cherry red, the compound is applied and then united in the usual manner.

What I claim is:

1. The method of preparing a compound for use in uniting metals consisting of slaking one part of quick lime in half its weight of water, adding a small quantity of sand, spreading four parts of melted borax flat on a warm steel plate, spreading the dried mixture of slaked lime and sand on the melted borax, cooling and removing the resulting compound from the plate, melting the compound, then again cooling and grinding and mixing with one part of iron filings.

2. The method of preparing a compound for use in uniting metals, consisting of spreading melted borax on a warm steel plate, sprinkling slaked lime thereon, cooling and removing the resulting compound from said plate, melting the compound, again cooling and grinding, and finally mixing with iron filings.

3. A compound for use in uniting metals comprising one part of quick lime, one-half part of water, four parts of borax, and one part of iron filings.

4. A compound for use in uniting metals comprising one part of quick lime slaked in one-half part of water, a small quantity of sand, four parts of borax and one part of iron filings.

In testimony whereof I have affixed my signature this 23rd day of June, 1920.

JOZEF KLEIN.